United States Patent [19]
Samuels et al.

[11] 3,832,784
[45] Sept. 3, 1974

[54] TURBINE VANE PREDICTION AND CLASSIFICATION GAGE AND GAGING METHOD

[75] Inventors: Ronald L. Samuels, Palos Verdes Peninsula; Wallace M. Porter, Redondo Beach; Josef E. Friederichs, Los Angeles, all of Calif.

[73] Assignee: TRW Inc., Redondo Beach, Calif.

[22] Filed: Nov. 29, 1972

[21] Appl. No.: 310,564

Related U.S. Application Data

[63] Continuation of Ser. No. 33,345, April 30, 1970, abandoned, which is a continuation-in-part of Ser. No. 868,675, Oct. 23, 1969, abandoned.

[52] U.S. Cl.......... 33/174 C, 33/174 PA, 33/174 L
[51] Int. Cl. .......................................... G01b 7/28
[58] Field of Search......... 33/174 L, 174 P, 174 PC, 33/174 PA, 174 C

[56] References Cited
UNITED STATES PATENTS

| 2,854,756 | 10/1958 | Aller | 33/174 PA |
| 3,464,119 | 9/1969 | Griggs | 33/174 C |
| 3,627,997 | 12/1971 | Samuels et al. | 33/174 C |
| 2,880,516 | 4/1959 | Tandler | 33/174 PA |

OTHER PUBLICATIONS

E. L. Watkins, "Inspecting Missle Airfoils Automatically," Control Engineering, Nov. 1956, pgs. 100–106.

*Primary Examiner*—William D. Martin, Jr.
*Assistant Examiner*—Richard R. Stearns
*Attorney, Agent, or Firm*—Daniel T. Anderson; Donald R. Nyhagen; Jerry A. Dinardo

[57] ABSTRACT

An instrument and method for prediction and classification gaging of production turbine vanes witout distortion of the vanes. In its prediction gaging mode, the instrument gages selected airfoil dimensions of a production tubrine vane and master and provides a figure of merit readout representing the difference between the effective class values of the master and vane resulting from the difference, if any, in their corresponding airfoil dimensions. This figure of merit is converted to an angle at which the class surface of the vane must be machined to provide the vane with a selected class value. In its classification gaging mode, the instrument gages the selected airfoil dimensions and the class face angle of the machined vane and provides a readout representing the actual class value of the machined vane. The airfoil dimensions and class surface are gaged with electrical transducers in such a way that there is no distortion of the master or vane.

7 Claims, 18 Drawing Figures

Ronald L. Samuels
Wallace M. Porter
Josef E. Friederich
INVENTORS

BY
*Donald R. Nyhagen*
ATTORNEY

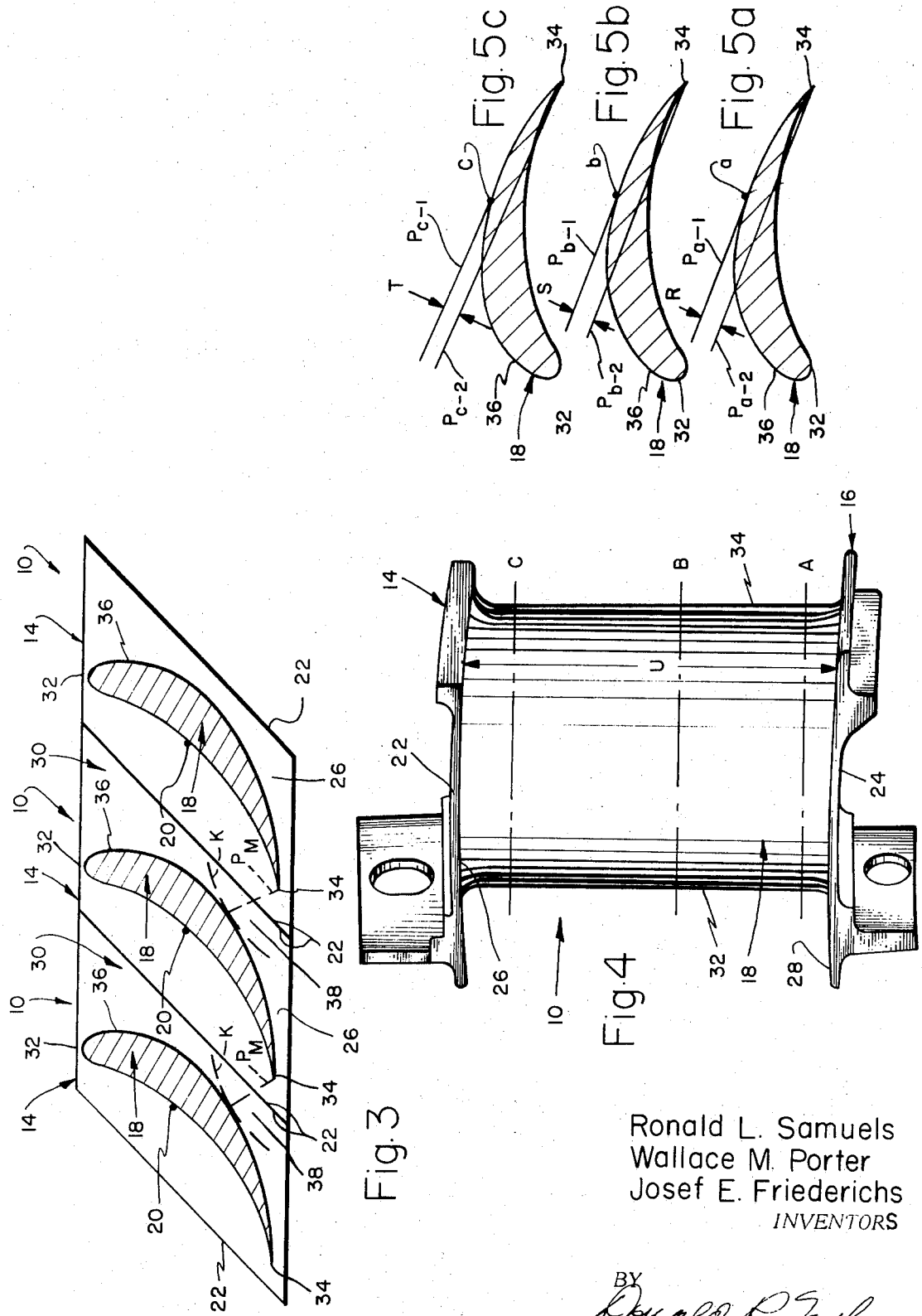

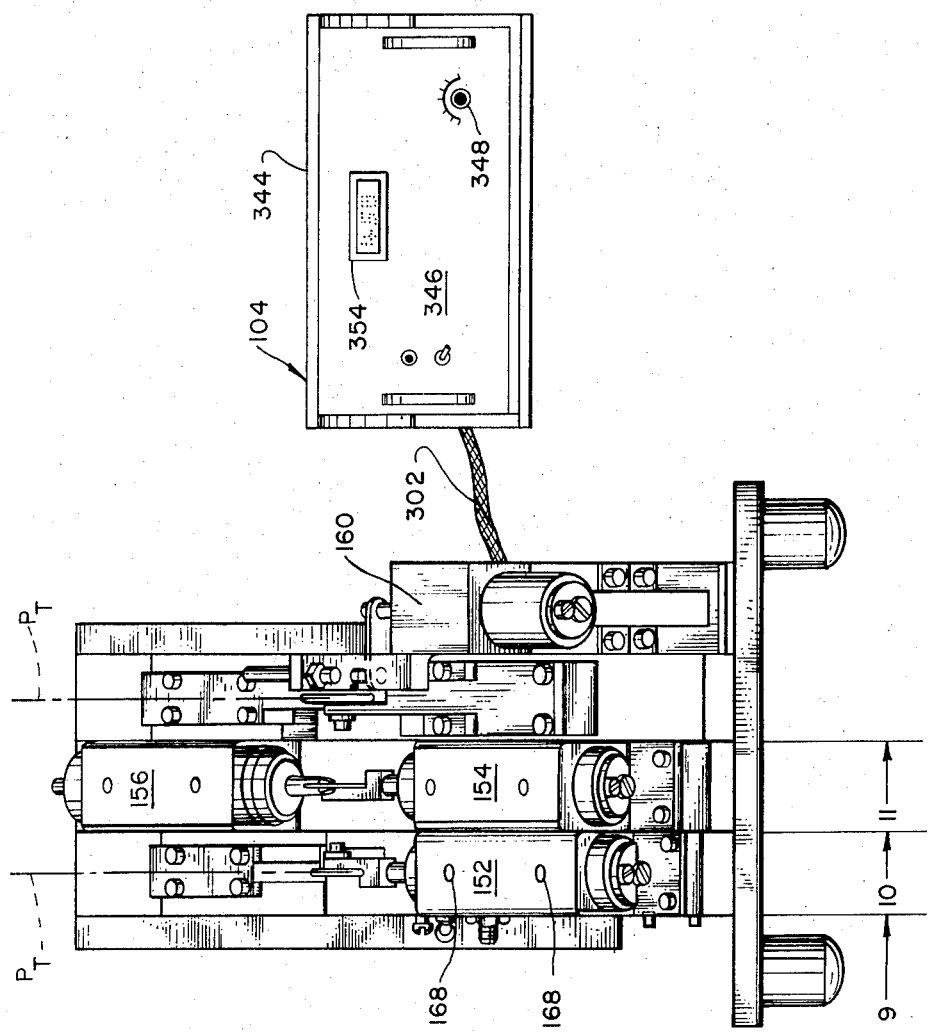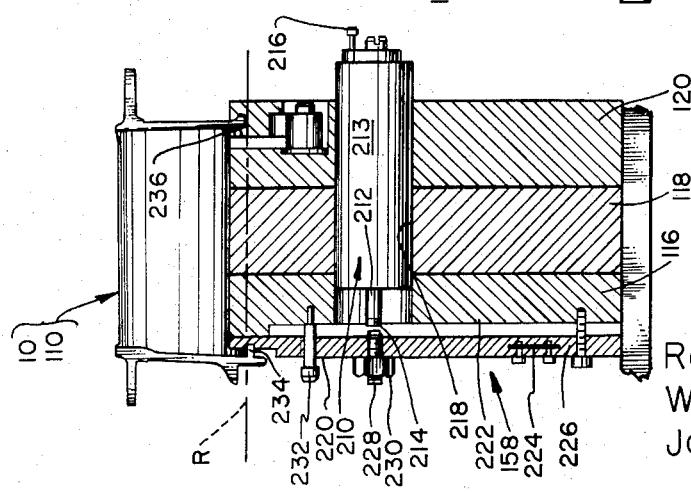

Ronald L. Samuels
Wallace M. Porter
Josef E. Friederichs
INVENTORS

Ronald L. Samuels
Wallace M. Porter
Josef E. Friederichs
*INVENTORS*

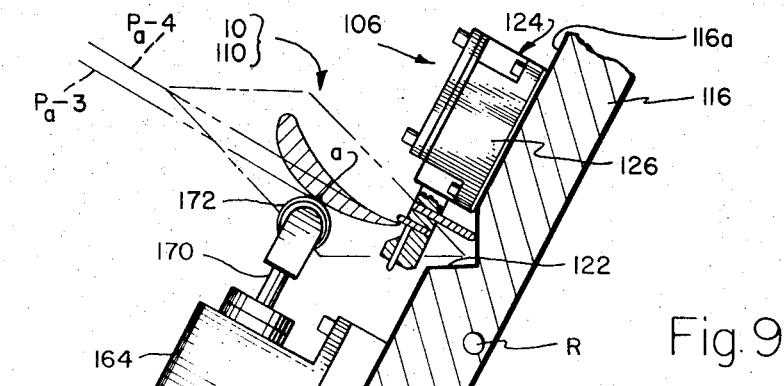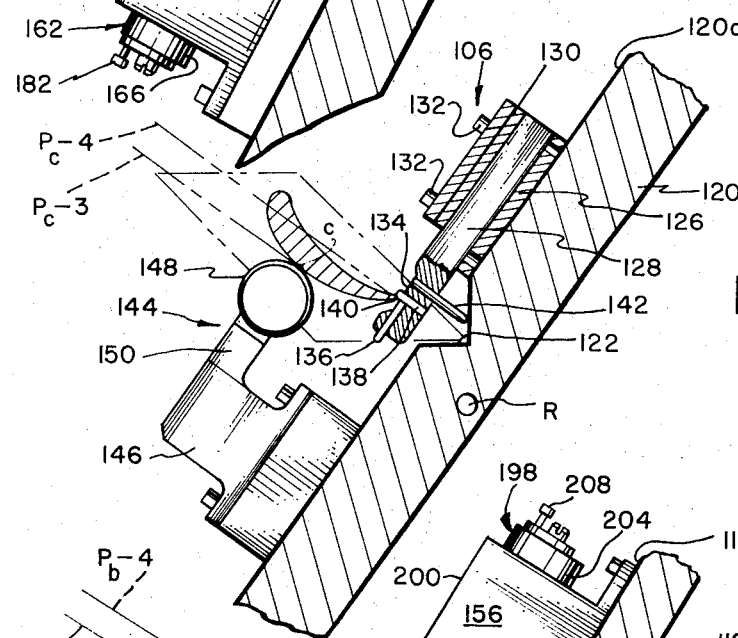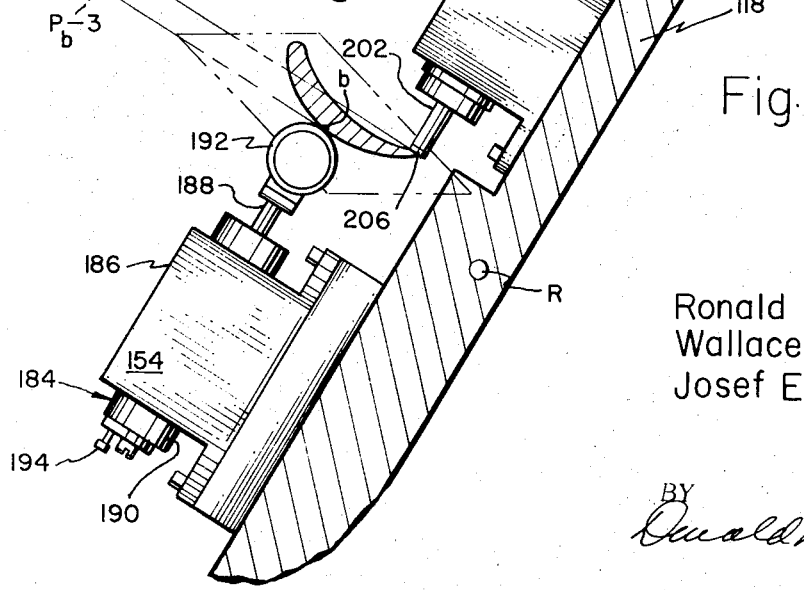

Ronald L. Samuels
Wallace M. Porter
Josef E. Friederichs
*INVENTORS*

TURBINE VANE PREDICTION AND CLASSIFICATION GAGE AND GAGING METHOD

COPENDING APPLICATION

This is a continuation, division, of application Ser. No. 33,345, filed Apr. 30, 1970, now abandoned which is a continuation-in-part of copending application Ser. No. 868,675, filed Oct. 23, 1969 now abandoned and entitled "Turbine Vane Prediction and Classification Gage and Gaging Method."

Reference is also made to copending application, Ser. No. 876,395, Now U.S. Pat. No. 3,627,997, entitled "Turbine Vane Prediction and Classification Gage and Gaging Method," and assigned to the same assignee as the present invention.

BACKGROUND OF THE INVENTION

1. Field of the Invention

This invention relates generally to turbines and more particularly to a turbine vane prediction and classification gaging instrument and method.

The invention has primary application to and will be described in connection with gaging of vanes for jet aircraft engines. However, the present instrument may be utilized for gaging other types of turbine vanes and thus should not be regarded as limited in application to the gaging of jet engine turbine vanes.

2. Prior Art

Jet aircraft engines have a final stage nozzle ring composed of a set of stationary turbine vanes each having tip and root buttresses and an intervening airfoil section. These vanes are assembled side-by-side in an annular configuration with machined seating faces of the root and tip buttresses on adjacent vanes in seating contact. One of these faces serves as a reference surface and is termed a class surface. Each pair of adjacent vanes defines an intervening flow passage having an effective minimum flow area, commonly referred to as an exit or throat area, measured within a plane of minimum spacing between the trailing edge of one vane and the opposing convex airfoil surface of the adjacent vane. The nozzle ring as a whole has a total effective flow area equal to the sum of the several intervane throat areas. According to conventional design procedure, the turbine designer specifies the vane airfoil shape, the nominal airfoil angle, and the nozzle ring flow area for a particular jet engine design. After construction, each jet engine is individually tested and tuned for optimum performance by adjusting the nozzle ring flow area.

Adjustment of the nozzle ring flow area is accomplished, in effect, by varying the airfoil angles and hence throat areas of the vanes. Thus, rotating the vane airfoils in one direction about their so-called stacking axes reduced the throat areas and hence the total effective nozzle ring flow area. Rotating the airfoils in the opposite direction increases throat area and hence total flow area. As is well known by those versed in the art, nozzle ring flow area is thus adjusted, not by physically rotating the vanes, but rather by selecting vanes whose class surfaces are machined at different angles relative to their airfoils such as to orient the latter at different angles relative to the plane of the nozzle ring. When assembling a set of turbine vanes into a nozzle ring, the vanes are selected or matched on the basis of the angular relation between their machined class surfaces and their airfoil sections, in a manner such as to provide the resulting nozzle ring with the desired flow area.

From the above discussion, it will be understood that a typical turbine vane may be installed in a nozzle ring in a range of angular positions to achieve the desired aerodynamic and thermodynamic results in the completed jet engine. The different airfoil angles at which the vane may be thus installed and their related throat areas are designated as classes. More accurately, the class designation of a turbine vane represents the throat or exit area of the flow passage defined by the vane and a second vane of the same class when assembled on a specified center spacing. The airfoil angle or class which provides the throat area used in the theoretical turbine design is designated as the basic class.

According to common turbine vane manufacturing procedure, a quantity of turbine vanes of the same basic vane configuration are cast with the basic class angle. The full range of vane classes are then fabricated from these basic casting by machining their class surfaces to the proper angles.

This manufacturing procedure presents one problem with which the present invention is particularly concerned. The problem referred to resides in the fact that while production turbine vanes may be cast with a relatively high degree of accuracy and precision, nevertheless, they cannot be cast to the exact dimensions used in the theoretical turbine design. In other words, production turbine vanes almost always exhibit some deviation in shape and/or size relative to the basic design vane. Typical deviations are oversize or undersize airfoil thickness and/or length, or a twist in the airfoil section. Each of these deviations alters the effective or so-called blocked area of a vane and hence both its throat area and the total nozzle ring flow area in which the vane is installed and must be taken into account in the vane classification process.

Thus, consider two perfect vanes of given class, i.e., vanes whose dimensions conform exactly to the nominal vane dimensions used in the theoretical design, assembled on specified centers. These vanes define an intervening class throat area measured in the plane of minimum spacing between the vane airfoils, which is a plane containing the trailing edge of one airfoil and intersecting the confronting convex airfoil surface of the opposing vane along a line passing through the points of tangency of the latter surface with arcs generated about spaced points on the trailing edge. The throat between the vanes is bounded along two sides by the trailing edge and convex airfoil surface and along its remaining two sides by the confronting inner shoulder faces of the vane root and tip buttresses.

Assume now that the perfect vanes are replaced by production vanes. Any deviation in the shape and/or size of the airfoil of either production vane from those of the perfect vanes increases or decreases, depending upon the type of deviation, the effective cross-sectional area, commonly referred to as blocked area, of the vane and hence the intervane throat area. For example, oversize airfoil thickness reduces the throat area as may twisting of the airfoil section. In order to provide the production vanes with the same throat area and hence class value as the perfect vanes, it is necessary to vary the airfoil angle of one or both production vanes in the proper direction to increase or decrease the throat area, as the case may be, by the correct amount to just compensate for the loss or gain of throat area resulting from the production vane deformities. This, in turn, requires accurate measurement or gaging of the production vanes to determine their dimensional deviations from the nominal vane dimensions used in the theoretical design, machining of the class surfaces of the production vanes to the proper angle to compensate for the deviations, and re-gaging of the machined vanes to determined their true class value.

The procedure of gaging turbine vanes for this purpose is referred to as prediction and classification gaging. Briefly, the first step of this procedure, known as prediction gaging, involves comparison of selected airfoil dimensions of a production vane with those of a perfect basic class vane, or master as it is called, to obtain a figure of merit representing the difference in class values of the production vane and master resulting from the differences, if any, in their corresponding airfoil dimensions. This figure of merit is then converted to an angle at which the class surface of the production vane must be machined to provide the finished production vane with a selected class value which may be the same as that of the master or some other selected class value. The second step of the procedure involves machining the class surface of the production vane to the angle determined by the prediction gaging step. The third and final step of the procedure, referred to as classification gaging, involves comparison of the selected dimensions and the angle of the machined class surfaces of the production vane and master to obtain the actual or true class value of the production vane.

Instruments, known as prediction and classification gages, have been devised for performing the prediction and classification steps of the gaging procedure outlined above. However, these existing gages suffer from certain deficiencies which this invention overcomes. All of these deficiencies need not be discussed in detail in this disclosure. Sufficie it to say, that a particularly serious defect of the existing gages resides in the fact that they subject the turbine vanes to clamping forces which distort the vanes and thus introduce error into the gaging process. Another drawback of the existing gages involves the measurement of the effective airfoil length, that is the spacing between the vane root and tip buttresses. Heretofore, this airfoil length measurement has been obtained with a separate gaging instrument, thus complicating and prolonging the overall prediction and classification procedure.

SUMMARY OF THE INVENTION

The present invention provides an improved turbine vane prediction and classification gaging instrument and method which cure the above and other defects of the existing gages. The present gage comprises two major components, to wit, a mechanical gaging fixture and a computer. The gaging fixture receives, in succession, a master vane and a production vane to be gaged. The fixture has electrical gaging means for producing electrical gaging signals representing deviations or deltas between corresponding selected critical dimensions of the master and vane. The computer receives these gaging signals from the fixture, and, in the prediction gaging mode, converts the prediction gaging signals to a figure of merit representing the difference in the class values of the production vane and the master. In the classification gaging mode, the computer converts the classification gaging signals from the fixture to the true class value of the production vane.

A particularly unique and important feature of the invention resides in the fact that no clamping forces of any kind are exerted on the production vane or the master during either prediction or classification. As a consequence, the vanes are not distorted, and the instrument provides prediction and classification readings of relatively high accuracy and precision.

According to another feature of the invention, the present prediction and classification instrument is arranged to measure or gage all of the critical vane dimensions, including the effective airfoil length. As a consequence, the present gaging instrument performs the classification and prediction gaging procedure in minimum time with a relatively high degree of accuracy and precision, thus reducing the overall turbine vane production time and cost.

BRIEF DESCRIPTION OF THE DRAWINGS

In the drawings:

FIG. 3 is an enlarged section taken on line 3—3 in FIG. 2;

FIG. 4 is a rear elevation of the turbine vane in FIG. 1 looking at the convex side of its airfoil;

FIGS. 5a, 5b, 5care sections through three chord stations A, B, and C of the turbine vane in FIG. 4;

FIG. 6 is a front elevation of the present turbine vane prediction and classification gaging instrument;

FIG. 9 is a section taken on the line 9—9 in FIG. 6;

FIG. 10 is a section taken on the line 10—10 in FIG. 6;

FIG. 11 is a section taken on line 11—11 in FIG. 6;

FIG. 12 is a section taken on line 12—12 in FIG. 7;

and

Figure 16:
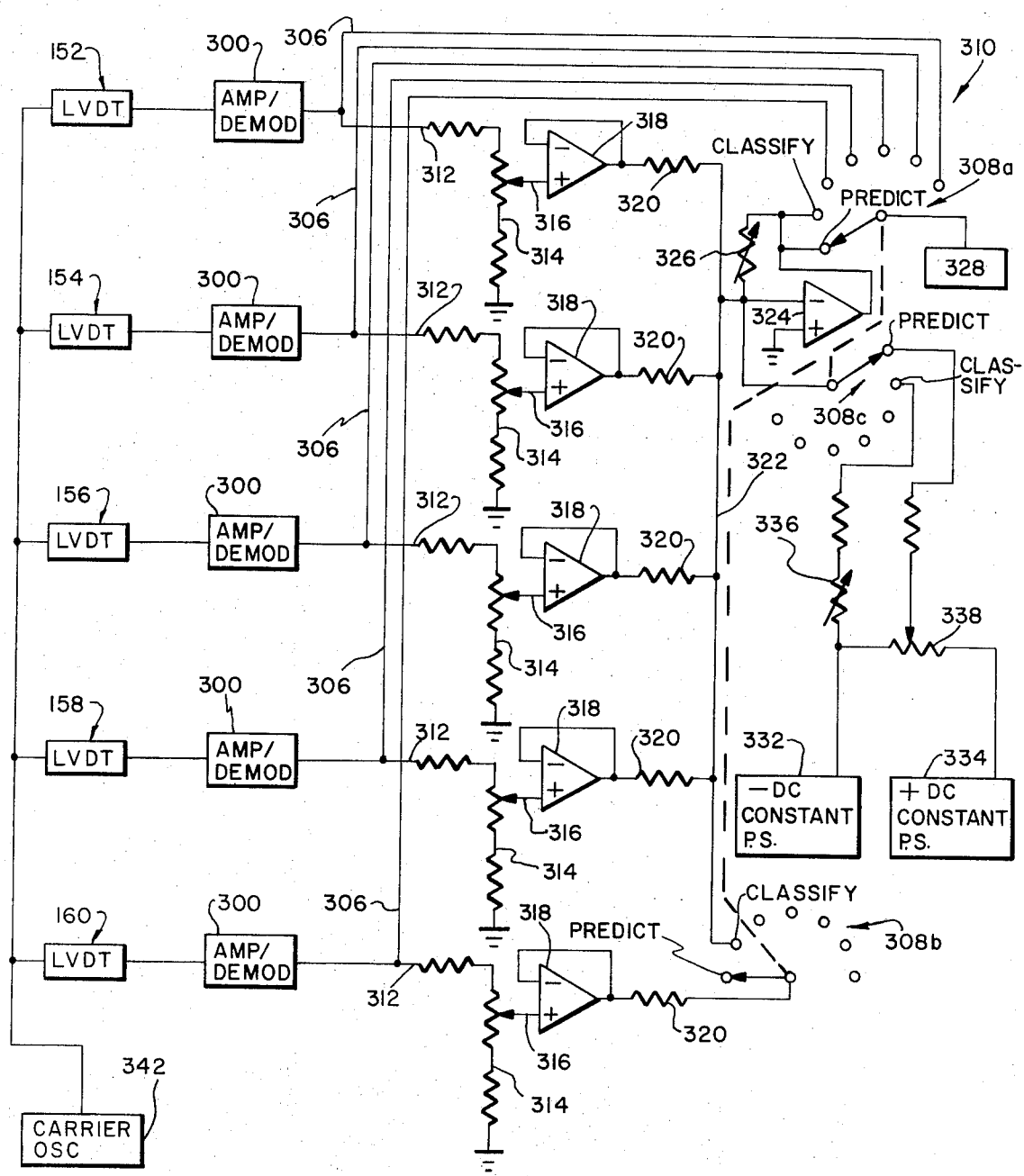

FIG. 16 is a schematic circuit diagram of the computer of the gaging instrument.

DESCRIPTION OF THE PREFERRED EMBODIMENTS

Figure 1:
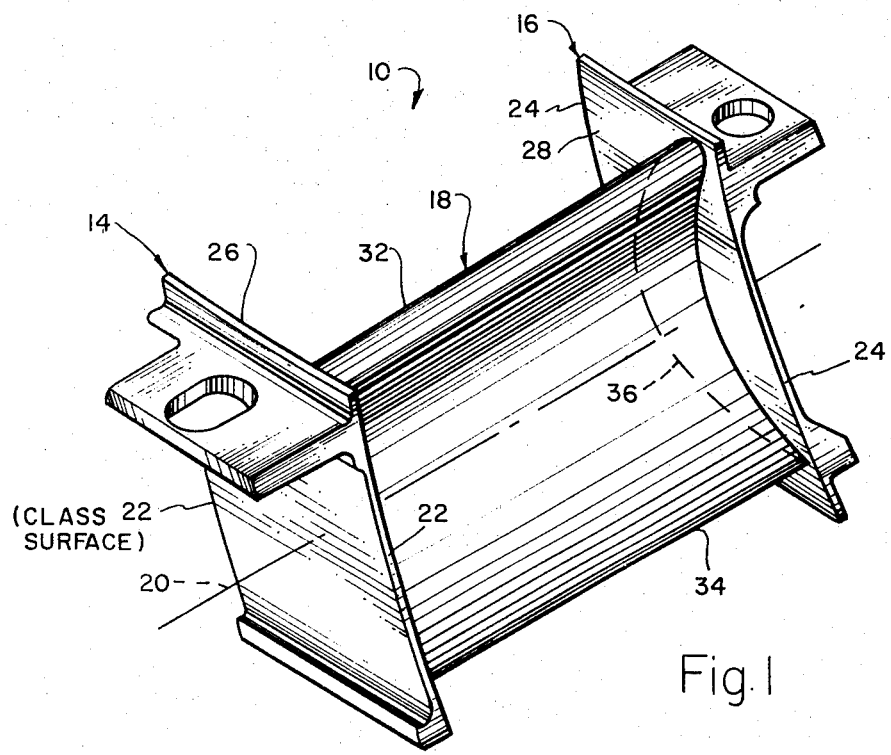
FIG. 1 is a perspective view of a turbine vane.
Figure 2:
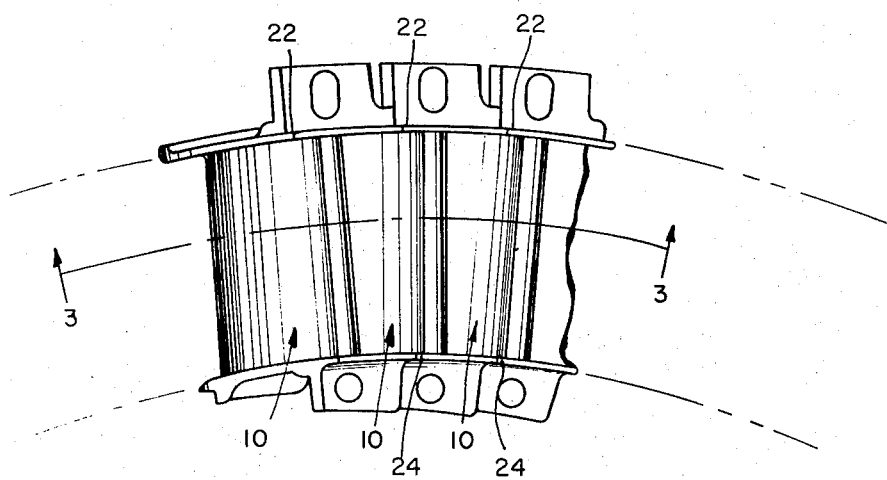
FIG. 2 is a framentary side elevation of a jet engine nozzle ring composed of a number of turbine vanes like that shown in FIG. 1.
Figure 7:
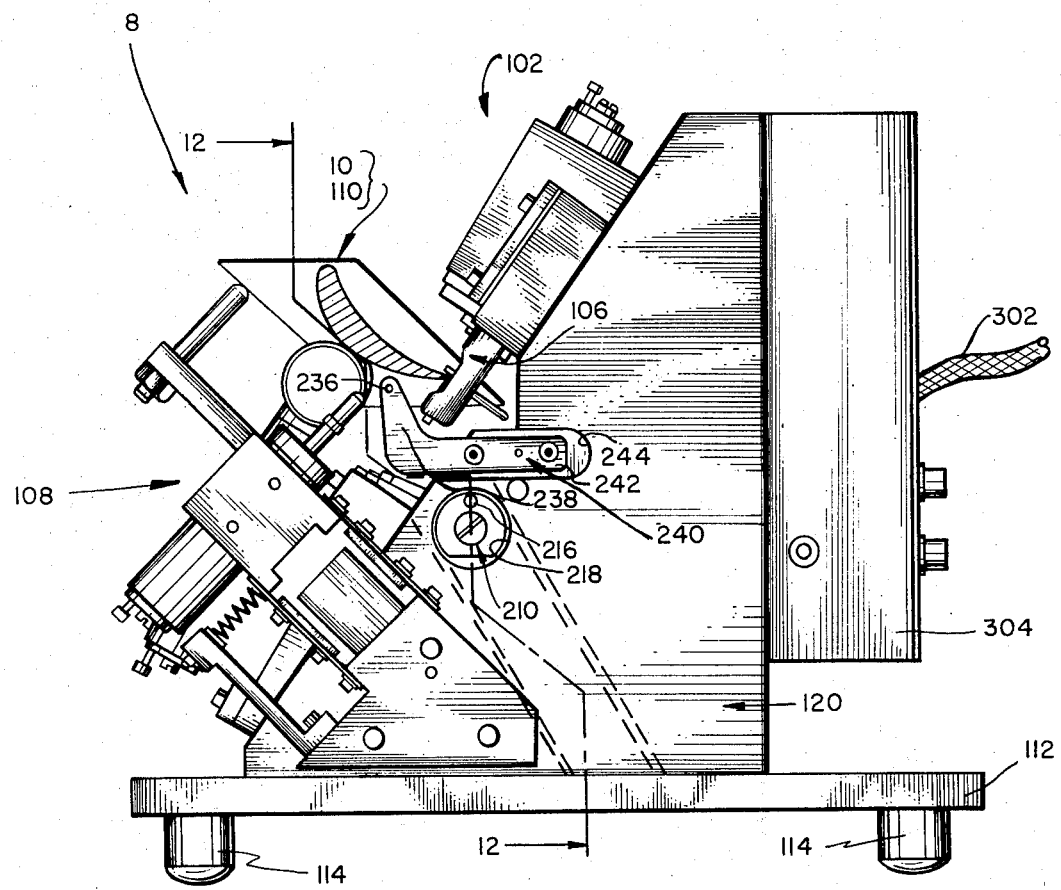
FIG. 7 is an elevational view of the right-hand side of the gaging fixture of the instrument.

Reference is made at first to FIG. 1 illustrating a typical turbine vane 10 of the type which is gaged in the present instrument and to FIG. 2 and 3 illustrating a portion of a jet engine nozzle ring 12 embodying the vanes 10. Each turbine vane 10 has a tip buttress 14, a root buttress 16, an intervening airfoil 18, and a longitudinal stacking axis 20. Buttresses 14 and 16 have laterally presented surfaces 22 and 24 and confronting longitudinally presented shoulder faces 26 and 28.

In the nozzle ring 12, the vanes 10 are assembled side-by-side with the surfaces 22, 24 of the adjacent vanes in contact and the vane stacking axes 20 extending radially of the nozzle ring. The assembled vanes are joined by means not shown to provide a rigid annular nozzle ring structure. The adjacent vanes define intervening tapered flow passages 30. Each flow passage is bounded along its two radial sides by the adjacent vane airfoils 18 and along its root and tip ends by the vane buttress surfaces 26, 28. The cross-sectional area of each flow passage diminishes in a direction from the leading edges 34 of the vane airfoils 18. Each passage has a minimum cross-sectional area measured in a plane $P_M$ of minimum spacing between the adjacent vanes. Planes $P_M$ contains the trailing edge 34 of one vane and intersects the confronting convex airfoil surface 36 of the opposing vane along a line passing through the points of tangency with the surface of circular arcs K generated about the trailing edge as a center. The minimum area portion 38 of the passage is commonly referred to as a throat and its area as the exit area of the vane flow passage 30. One of the tip buttress seating surfaces 22 provides a reference surface, or class surface as it is called and designated in the drawings.

As noted earlier, a typical turbine vane may be used in a range of angular positions to achieve desired aerodynamic and thermodynamic characteristics in the completed jet engine. In this regard, it will be observed in FIG. 3 that rotation of the vanes 10 about their stacking axes 20 to vary the angle of the vane airfoils 18 relative to the plane of the nozzle ring 12 increases or reduces, depending upon the direction of the rotation, the areas of the vane throats 38. In actual practice, such vane rotation is accomplished, not by physically rotating the vanes about their stacking axes, but rather by machining their class surface 22 at various angles to orient the vane airfoils 18 at various angles relative to the nozzle ring plane. The different angles at which vanes of a given design may be used and the resulting throat areas are referred to as classes. The delta angle between successive classes is constant, or approximately constant, over the entire class range. According to the conventional jet engine design practice discussed earlier, the engine designer specifies the nominal airfoil angle, center spacing, and throat area for a nozzle ring vane set. The vane class which has this nominal airfoil angle and throat area is referred to as the basic class, its airfoil angle as the basic class angle, and its throat area as the basic class area. The jet engine is initially constructed with a nozzle ring composed of such basic class vanes. After construction, the engine is tuned by replacing selected vanes by vanes of another class or other classes, as necessary to provide the engine with the proper nozzle ring flow area for optimum engine operation.

It will also be recalled from the earlier discussion that according to conventional turbine vane manufacturing practice, the turbine vanes for a particular engine design are initially cast to the basic class angle. The class surface 22 of the castings are then machined to the appropriate angles to provide finished vanes of the full range of classes required for engine tuning purposes. Since the throat area between two vanes paired on given centers is a function of both the airfoil angle and airfoil dimensions of the vanes, the deviations between the actual airfoil dimensions of the cast production vanes and the nominal airfoil dimensions of the basic class vane used in the theoretical engine design must be taken into account when machining the castings in order to achieve finished vanes of a desired class.

In this latter regard, assume a pair of perfect vanes of given basic class, that is a pair of vanes which conform exactly to a theoretical basis class vane design, assembled side-by-side on specific centers within a nozzle ring, as in FIG. 3. Being perfect vanes, the latter define an intervening throat 38 whose area exactly equals the throat area of the basic vane class. Assume next that one vane of the vane pair, say the vane whose convex airfoil surface 36 borders the throat, is replaced by a production vane whose airfoil 18 is oriented at the same basic class angle but has slightly different dimensions and hence a different blocked area than the airfoil of the perfect vane. In this case, the actual throat area between the production vane and the remaining perfect vane differs from the class throat area by an amount equal to the difference between the blocked areas of the production vane and the perfect vane. In order to provide the production vane with the basic class value of the perfect vane or some other selected class value, the airfoil of the production vane must be rotated to an angle equal to the airfoil angle of the selected class plus or minus a compensating angle necessary to compensate or correct for the difference in the blocked areas of the perfect basic class vane and production vane. As noted earlier, this rotation of the airfoil is accomplished, not by physically turning the vane, but by machining its class surface 22 at the proper angle.

It will now be understood that the described practice of producing turbine vanes of a full range of classes for a particular jet engine design from production vanes that are initially cast to the basic class angle used in a given theoretical design involves the following steps:

1. Gaging the airfoil of each production vane at the basic class angle to determine its dimensional deviations, if any, from the nominal dimensions of the basic class vane airfoil used in the theoretical design;

2. Determining the angle to which the class surface 22 of each production vane must be machined to compensate for such dimensional deviations and provide the finished vane with a selected class value;

3. Machining the class surface of each production vane to the appropriate angle; and 4. Gaging each machined production vane to determine its true class value.

The above procedure is referred to broadly as prediction and classification gaging. The first step constitutes a prediction gaging step and the last step constitutes a classification gaging step.

The present invention is concerned with a prediction and classification gaging procedure which involves the use of so-called class formulas, referred to later as prediction and classification formulas, that express class value and class difference (figure of merit) in terms of certain critical airfoil and class surface dimensions. According to this procedure, a perfect vane, or master, is prepared whose critical airfoil and class surface dimensions exactly equal those of the basic class vane used in the theoretical design. The critical airfoil dimensions of this master and a production vane are then compared, and the differences or deltas, if any, in the corresponding dimensions are combined in accordance with the appropriate class formula (prediction formula) to obtain a figure of merit representing the difference in class values of the master and vane resulting from the differences, if any, in the airfoil dimensions. This figure of merit is converted, with the aid of existing tables, to a predicted angle at which the class surface of the production vane must be machined to provide the finished vane with a selected class value. The above steps constitute the prediction gaging phase of the gaging procedure. After machining of the class surface of the production vane to the predicted angle, the critical airfoil and class surface dimensions of the master and production vane are compared and the differences or deltas in the corresponding dimensions are combined in accordance with the appropriate class formula (classification formula) to obtain the true class value of the vane. The latter steps constitute the classification gaging phase of the gaging procedure.

In connection with this prediction and classification procedure, consider FIGS. 5a, 5b, and 5c which are sections through the airfoil 18 of a perfect basic class vane at three chord stations, A, B, and C (FIG. 4) located at the root end, center, and tip end, respectively, of the airfoil. The points $a$, $b$, and $c$ in these figures represent points on the convex airfoil surface 36 at the respective chord stations located in the throat plane $P_M$. The reference characters $P_{a-1}$, $P_{b-1}$, and $P_{c-1}$ represent planes tangent to the convex airfoil surface at the points $a$, $b$, and $c$, respectively. The reference characters $P_{a-2}$, $P_{b-2}$, and $P_{c-2}$ represent planes parallel to the corresponding planes $P_{a-1}$, $P_{b-1}$, and $P_{c-1}$ and tangent to the airfoil trailing edge 34 at the concave side of the vane. The reference characters R, S, and T represent the effective airfoil thickness dimensions at the chord stations A, B, and C, respectively, measured between and normal to the corresponding tangent planes $P_{a-1}$, $P_{a-2}$, $P_{b-1}$, $P_{b-2}$, $P_{a-3}$, and $P_{b-3}$. The reference character U represents the effective length of the airfoil 18 measured between predetermined points on the confronting buttress shoulder faces 26, 28 adjacent the throat plane $P_M$. Finally, the reference character V represents a factor proportional to the angle of the class surface 22 relative to a predetermined reference plane.

Referring now again to the prediction and classification gaging procedure discussed above, the critical delta dimensions used in the procedure are the differences or deltas between the following dimensions of the master and the production vane being gaged: the airfoil thickness dimensions R, S,; the airfoil length dimension U; and the class surface angle factor V. The class formulas in which these dimensions are used to obtain the figure of merit and class value of a production vane vary from one vane design to another and will be discussed presently. Suffice it to say at this point that the above mentioned delta dimensions which are used in the formulas to obtain the figure of merit and class value of a production vane are hereafter referred to by the reference characters $\Delta R$, $\Delta S$, $\Delta U$, and $\Delta V$, respectively.

The present invention provides a prediction and classification gaging instrument 100 for performing the prediction and classification gaging procedure outlined above. This gaging instrument includes two major components, namely, a gaging fixture 102 and a computer 104. The gaging fixture 102 is equipped with vane supporting means 106 and electrical gaging means 108 for gaging and generating electrical signals representing the critical vane measurements or deltas referred to above. The computer 104 combines these electrical signals in accordance with the appropriate class formula for the vane being gaged to provide prediction and classification readouts, as explained below. The gaging instrument 100 has two operating modes, a prediction gaging mode and a classification gaging mode. In each mode, a master and a cast vane are gaged in succession in the fixture 102. At this point, it is significant to note that an actual master only simulates the basic class vane used in the theoretical design: that is to say, the master is provided with gaging surfaces which are accurately machined to provide the master with R, S, U, and V dimensions exactly equal to those of the basic class vane used in the theoretical design, but the actual overall shape of the master differs substantially from that of the basic vane configuration. However, for simplicity, it will be assumed in the present disclosure that the master has a true vane shape. Further, at some points in the ensuing description, it will be assumed that the vane which is illustrated in the gaging fixture 102 is the master and at other points in the description it will be assumed that the illustrated vane is a production vane to be gaged. The same reference characters and numerals used in the earlier description of the vane 10 will be applied to the master, except that the master will be referred to in its entirety by the numeral 110.

Briefly, in operation of the gaging instrument 100, the latter is initially set in its prediction gaging mode. In this mode, the instrument is conditioned to provide a figure of merit readout representing the difference in the class values of the production vane 10 being gaged and the maSter 110. The master is then placed at its basic class angle in the vane supporting means 106 and the computer 104 is adjusted to register a zero figure of merit readout indicative of the fact that the gaged dimensions and hence effective blocked area of the master conform exactly to those of the basic vane configuration used in the theoretical design. Following this initial setting and adjustment of the instrument, the master 110 is replaced by the production vane 10 to be gaged. The computer 104 then registers a figure of merit readout representing the difference between the class values of the production vane and master.

In the next step of the prediction and classification gaging procedure, the figure of merit reading just obtained is converted, with the aid of prepared tables, to an angular value representing the angle to which the class surface 22 of the production vane must be machined to provide the finished vane with the same class value as the master or some other selected class value. The production vane 10 is then removed from the gaging fixture 102 and its class surface machined to the appropriate angle by the conventional vane machining technique.

The gaging instrument 10 is now set in its classification gaging mode. In this mode, the instrument is conditioned to provide a readout representing the true class value of the machined production vane 10. The master 110 is then repositioned at its basic class angle in the gaging fixture 102, and the instrument is adjusted to register the basic class value of the master. Thereafter the master is replaced by the machined vane 10. The instrument then registers the true class value of the machined vane.

Referring now in greater detail to the embodiment of the invention, which has been selected for illustration, the gaging fixture 102 comprises a horizontal base plate 112 having supporting legs 114. Fixed side-by-side to the upper surface of the base plate are three similar, generally triangular base blocks 116, 118, and 120. These blocks have sloping front faces 116A, 118A, 120A, respectively. The front faces of the two outer blocks, 116, 120, have aligned V-shaped notches 122 with horizontal bottom walls and vertical rear walls. These notches are located about mid-way between the upper and lower ends of the block faces.

The vane supporting means 106 of the fixture comprise a pair of essentially identical vane supports 124 on the two outer base blocks 116, 120. Each support comprises a channel-shaped bracket 126 which is bolted to the front face 116A or 120A of the respective block, just above the block notch 122, with the axis of the channel extending lengthwise of the face. Slidable in each channel bracket 126 is a bar 128. A clamp plate 130 extends across the top of each bracket and is attached to the latter by bolts 132. These bolts may be tightened to clamp the bar 128 in fixed position within the bracket. The front or lower end of the support bar 128 has an upper recess 134 which exposes the abutting ends of a pair of hardened pins 136, 138 press fitted in the bar. Pin 136 extends parallel to the longitudinal axis of the bar. Pin 138 extends perpendicular to the bar axis and hence to the pin 136. Accordingly, the pins 136, 138 on each support bar 128 define a right-angle corner 140, or trap as this corner is hereinafter referred to. As will appear presently, the traps 140 of the vane supports 124 seat the trailing airfoil edges 34 of the production vane 10 being gaged and the master 110. Threaded in the outer end of each bar 128 is a set screw 142 which seats against the rear wall of the adjacent base block notch 122 to vertically support the bar end against downward deflection. The set screws are adjustable to provide this support in every position of adjustment of the bars 128 relative to their channel brackets 126.

As noted earlier, and explained in greater detail in the ensuing description, the master 110 and production vane 10 are placed in the traps 140 successively. For convenience in this ensuing description, both the production vane and the master will be referred to, in places, simply as vanes. When a vane is seated in the traps, its airfoil 18 projects laterally out from the base blocks 116, 118, and 120 with the convex airfoil surface 36 facing the lower ends of these faces. The outer base block notches 122 provide clearance for the vane buttresses 14, 16, as shown. It will be observed that the traps accommodate limited pivotal movement of the vane about its trailing edge.

Mounted on the front face 120A of the right-hand base block 120, just below its notch 122 and vane trap 140, is a fixed stop 144. This fixed stop includes a bracket 146 bolted to the base block 120 and a hardened roller or wheel 148 rotatably supported on a rear upwardly sloping arm 150 of the bracket. The edge of wheel 148 engages the confronting convex airfoil surface 36 of the vane 10 or 110 currently positioned in the fixture 102 to support the vane in its illustrated gaging position. The vane airfoil 18 is then disposed at a fixed angle relative to the fixture base plate 112. As will appear presently, the fixed stop 144 is arranged to locate the airfoil of the master vane 110 at its basic class angle relative to the fixture base plate.

The electrical gaging means 108 of the gaging fixture 102 comprise five electrical gages 152, 154, 156, 158, and 160. Gage 152 includes an electrical linear variable differential transformer or transducer 162 mounted in a holder 164. This holder is bolted to the front face 116A of the left-hand base block 116, just below its notch 122. Transducer 162 has a housing 166 slidable in the holder 164 and fixed in position by set screws 168. Longitudinally movable in the housing is a plunger 170 hich extends from the upper rear end of the housing. The outer end of the plunger mounts a hardened roller or wheel 172. Plunger 170 is supported for axial movement in the housing 166 by flexure 174 and includes a magnetic core 176. Surrounding the core is an axially adjustable coil 178. A spring 180 seats against one end of the coil. A set screw 182 seats against the other end of the coil. Set screw 182 is threaded in and accessible externally of the transducer housing 166 for adjusting the axial position of the coil relative to the transducer housing and the plunger. Coil 178 has a center primary winding to be energized from an a-c source and two outer secondary windings which are wound and connected in the well known way to provide an output voltage signal, when the primary winding is energized, representing the relative axial position of the core and coil and hence the relative axial position of the transducer plunger 70. Thus, the transducer produces a zero or null output when the core occupies its centered or null position relative to the coil 178, and an output voltage which varies linearly with axial displacement of the core from its null position. The output voltage has one phase relative to the excitation voltage when the core displacement is to one side of the null position and an opposite phase when the core displacement is to the opposite side of the null position.

Gage 154 is essentially identical to gage 152 and hence need not be described in detail. Suffice it to say that the gage 154 includes an electrical transducer 184 adjustably mounted in a holder 186 bolted to the front face 118A of the center base block 118 along side the gage 152. The transducer plunger 188 extends from the upper rear end of the transducer housing 190 and mounts a hardened roller or wheel 192. The transducer coil is adjustable relative to the housing and the plunger by a set screw 194.

Gage 156 is also similar to gage 152 and includes an electrical transducer 198 adjustably mounted in a holder 200 bolted to the front face 118A of base block 118 above and directly opposite gage 154. The upper portion of the block face 118A supporting the gage 156 is stepped downwardly relative to the lower portion of the block face supporting the gage 154. This stepped configuration of the block face locates the gages 154, 156 in laterally offset relation, as shown, for reasons to be explained presently. Transducer 198 includes a plunger 202 which extends from the lower end of the transducer housing 204 and terminates in a hardened flat faced tip 206. At the upper end of the housing is a set screw 208 for adjusting the transducer coil relative to the housing and plunger. As will be explained presently, the fixed vane stop 144 and gages 152, 154, and 156 are arranged to contact the vane currently positioned in the fixture at its root, center, and tip chord stations A, B, and C. Gages 152, 154, and 156 gage the ΔR and ΔS vane measurements, referred to earlier.

Gage 158 gages the ΔU vane measurement and comprises an electrical transducer 210 essentially identical to the transducer 198 of gage 156. Thus, the transducer 210 has a plunger 212 which extends axially from one end of the transducer housing 213 and terminates in a hardened flat faced tip 214. A set screw 216 is exposed at the opposite end of the housing for adjusting the transducer coil. Transducer 160 is slidably fitted in aligned bores 218 extending through the base blocks 116, 118, and 120 parallel to the base plate 112 and normal to the axes of the gages 152, 154, and 156. The transducer housing is fixed in position within the bore by set screws (not shown). Transducer 210 is positioned in the bore 218 with its plunger 212 exposed at the left end of the bore.

In addition to the transducer 210, gage 158 includes a gage arm 220 positioned within a groove or recess 222 in the outer left-hand face of base block 116. The adjacent end of the transducer bore 218 opens to this recess, as shown. The lower end of the gage arm 220 is hingably attached by a flexure 224 to a block 226 which is bolted in place within the lower end of the recess 222. Threaded in the gage arm on the axis of the transducer 210 is a set screw 228 with a lock nut 230. The inner or right-hand end of this set screw seats against the hardened tip 214 of the transducer plunger 212. A shoulder screw 232 extends through an enlarged hole in the gage arm 220 just below the set screw 228 and is threaded in the base block 116 to form a limit stop for limiting outward hinging of the arm away from the base block. Fixed in the upper end of the gage arm is a hardened pin 234 which projects a small distance beyond the outer surface of the arm. The transducer 210 is fixed in the bore 218 in a position such that the transducer flexures yieldably retain the transducer plunger 212 in contact with the gage arm set screw 228 throughout its range of hinging movement.

As will appear presently, the gage arm pin 234 is arranged to seat against the inner shoulder face 26 of the vane root buttress 14. Gage 160 has a fixed second gage pin 236 for seating against the inner shoulder face 28 of the vane tip buttress 16. Pin 236 is fixed in the end of an upstanding arm 238 of an L-shaped bracket 240. The remaining arm 242 of this bracket is bolted to the bottom wall of a horizontal groove 244 in the right-hand face of the right-hand base block 120, just above the transducer bore 218. Gage pins 234, 236 are located on a common axis R parallel to the axis of the transducer 210.

The remaining gage 160 is arranged to gage the angle factor V of the vane class surface 22 and has a novel construction which is uniquely adapted to this function. Gage 160 comprises a transducer 246 mounted in a holder 248 in the form of a rectangular block. Holder 248 is attached by a pair of flexures 250 to a mounting block 252 bolted to the outer right-hand face of the right-hand base block 120, adjacent the lower front corner of this block. Bolted to the inner surfaces of the flexures 250 are rigid plates 254. In the normal position of the gage, the flexures 250 are parallel to one another and normal to the axis of the gage transducer 246. These flexures have equal effective lengths measured between their points of attachment to the transducer holder 248 and mounting block 252. Also, the points of attachment at each end of the flexures are aligned in a direction parallel to the transducer axis. Finally, the plates 254 have equal length somewhat less than the effective flexure lengths and are centered between the points of flexure attachment. From this description, it will be understood that the flexure support 250, 254 effectively forms a parallelogram spring mount for the transducer 246 which supports the latter for translational movement along its axis. Mounting block 252 has a reduced extension 256 projecting between the flexure plates 254 for limiting translation movement of the transducer. Acting between the holder 248 and a bracket 258 attached to the mounting block 252 is a spring 260. This spring urges the transducer 246 axially upward as viewed in the drawings.

Transducer 246 is essentially similar to the transducers 156, 158 and includes a housing 262 adjustably secured within the holder 248. The transducer plunger 264 extends from the upper end of the housing and terminates in a hardened rounded tip 266. At the rear end of the housing is a set screw 268 for adjusting the transducer coil. Rigidly joined to the upper side of and extending upwardly from the transducer holder 248, generally normal to the transducer axes, is a bracket arm 270. Threaded in the upper end of this arm, parallel to the transducer axis, is a hardened gage pin 272 mounting a lock nut 274 and having a rounded tip 276. Gage pin 272 is adjustable so that its tip 276 and the tip 266 of the transducer plunger 264 are tangent to a common plane approximately normal to the transducer axis when the plunger occupies its normal position, i.e., the position occupied by the plunger when free of external forces. It will now be understood that the flexures 250 support the gage transducer 246 and gage pin 272 for axial translation in unison. The transducer plunger 264 is also axially movable independently of the gage pine 272.

As noted earlier, the present gaging instrument 100 is used for practicing a prediction and classification gaging procedure wherein the R, S, and U dimension of a production vane 10 and master 110 are compared and the dimensional differences, if any, are combined according to a prediction formula to obtain a figure of merit representing the difference in the class values of the vane and master. This figure of merit is then converted to an angle to which the class surface 22 of the production vane must be machined to provide a finished vane of the desired class value. After machining of the surface, the R, S, U, and V dimensions of the vane and master are compared and the dimensional differences are combined according to a classification formula to provide a readout representing the true class value of the vane.

To this end, the gaging fixture 102 is designed to receive, in the illustrated gaging position, both the production vane 10 to be gaged and the master vane 110. In this gaging position, the root end of the vane currently positioned in the fixture, i.e., either the cast vane or the master, is located at the left-side of the fixture as the latter is viewed from the front. The trailing edge 34 of the vane airfoil 18 rests in the traps 140 with the trailing edge seating downwardly against the trap pins 136 and rearwardly against the trap pins 138. The wheel 148 of the fixed vane stop 144 engages the convex airfoil surface 36 of the vane to support the latter at a fixed airfoil angle relative to the fixture base plate 112. The wheels 172, 192 of the vane gages 152, 154 engage the convex airfoil surface 36 at positions spaced along the airfoil 18 from the fixed stop. The plunger tip 206 of the vane gage 156 engages the vane trailing edge 34 at the concave side of the airfoil 18. The gage pins 234, 236 of the vane gage 158 seat against the confronting root and tip buttress shoulder faces 26, 28, respectively. Finally, the transducer plunger 264 and gage pin 272 of the vane gage 160 seat against the confronting tip buttress class surface of the vane.

The two pins 136, 138 of each vane trap 140 are perpendicular to one another and located in a common plane $P_t$ normal to the common axis R of the gage pins 234, 236. The two planes $P_t$, which are hereafter referred to as trap planes, are spaced a distance equal to the spacing between the root and tip chord stations A, C of the vanes to be gaged. The wheel 148 of the fixed vane stop 144 is located in the right-hand or tip trap plane $P_t$ as the gaging fixture is viewed from the front. The wheel 172 of the left-hand vane gage 152 is located in the left-hand or root trap plane $P_t$. The wheel 192 and the plunger 202 of the center vane gages 154, 156 are located in a common plane between and parallel to the trap planes, and spaced from the trap planes distances equal to the spacing between the center chord station B and the root and tip chord stations A, C of the vanes to be gaged.

The vane traps 140 are so arranged that when the trailing edge 34 of the master vane 110 is properly seated in the traps, its stacking axis 20 is parallel to the common axis R of the gage pins 234, 236 and perpendicular to the trap planes $P_t$. Accordingly, the chord planes of the three vane chord stations A, B, and C are then perpendicular to the axis R and parallel to the trap planes $P_t$. The fixed gage pin 236, which contacts the shoulder face 28 of the vane tip buttress 16, locates the vane endwise, i.e., in the direction of its stacking axis 20, relative to the gaging fixture 102 in a position wherein the chord planes of the root and tip chord stations A, C of the vane coincide with the two trap planes $P_t$. In this regard, it will be recalled that the vane is placed in the gaging fixture 102 with the root end of the vane to the left. Accordingly, the root chord station A coincides with the left-hand trap plane and the tip chord station C coincides with the right-hand trap plane. The center vane gages 154, 156 are so located that the common plane of the gage wheel 192 and gage plunger 202 coincides with the plane of the center vane chord station B.

From the foregoing description, it will be understood that the wheels 172, 192 of the vane gages 152, 154 contact the convex surface 36 of the vane airfoil 18 at its root and center chord stations A, B, respectively. The wheel 148 of the fixed vane stop 144 contacts the convex airfoil surface at its tip chord section C. The plunger 202 of the vane gage 156 contacts the trailing edge of the airfoil at its center chord station B.

At this point, consider again FIGS. 5a, 5b, and 5c illustrating root, center, and tip chord sections of a perfect basic class vane or master 110 for a particular jet engine design. From the earlier discussion relative to these figures, it will be recalled that points a, b, and c represent points on the convex airfoil surface 36 at the chord stations A, B, and C located in the throat plane $P_M$ of the vane. In other words, points a, b, and c are the points of tangency, at the chord stations A, B, and C of the convex airfoil surface with circular arcs (i.e., arcs K in FIG. 3) generated about the trailing edge 34 of an adjacent vane. In the particular case at hand, wherein the illustrated vane is assumed to be a perfect vane or master 110, the arcs which define the tangency points a, b, and c have predetermined radii $R_a$, $R_b$, $R_c$ equal the width of the vane throat 38 at the chord stations A, B, and C, respectively. For this reason, these radii will be hereafter referred to as throat width dimensions.

The R, S, and T dimensions are effective airfoil thickness dimensions measured between and are normal to the respective tangent planes $P_{a-1}$, $P_{a-2}$, $P_{b-1}$, $P_{b-2}$, $P_{c-1}$, and $P_{c-2}$. The U dimension is the effective airfoil length dimension measured between the confronting buttress shoulder faces 26, 28 approximately in the throat plane $P_M$.

Returning again to the gaging fixture 102, the wheel 148 of the fixed vane stop 144 has a radius equal to the throat width dimension $R_c$ at the tip chord station C of the master 110. The fixed stop is so mounted that the axis of its wheel 148 and the right angle corners defined by the pins 136, 138 of the vane traps 140 occupy the same relative positions as do the trailing edges 34 of two adjacent perfect vanes or masters 110 when assembled in the manner of FIG. 3. From this description, it will be understood that when a master 110 is placed in gaging position in the fixture 102, the fixed vane stop wheel 148 contacts the convex airfoil surface 36 of the master at its tip chord station tangency point c. The fixed stop supports the master at a fixed airfoil angle relative to the plane of the fixture base plate 112. In the particular embodiment of the invention illustrated, the fixed airfoil angle is the basic class angle of the master. It is significant to note that the angle of the master, when in gaging position, is such that gravity holds its trailing edge in the trap 140 and its convex airfoil surface 36 against the wheel 148 of the fixed stop. The longitudinal axis of adjustment of the adjacent vane trap support bar 128 is perpendicular to a plane $P_{c-3}$ tangent to the fixed stop wheel 148 at its point of contact with the master airfoil surface 36. The front vane engaging side of the adjacent trap pin 138 is located in a plane $P_{c-4}$ normal to the bar axis and parallel to the tangent plane $P_{c-3}$.

The wheel 172 of the vane gage 152 has a radius equal to the throat width dimension $R_a$ at the root chord station A of the master 110. Gage 152 is mounted on the fixture 102 in a manner such that its wheel 172 contacts the convex airfoil surface 36 of the master 110 at its root chord station tangency point a, when the master occupies its gaging position of contact with the fixed stop 144. The longitudinal axis of the plunger 170 of the gage transducer 162 is perpendicular to a plane $P_{a-3}$ tangent to the gage wheel 172 at its point of contact with the airfoil surface 36. The longitudinal axis of adjustment of the adjacent vane trap support bar 128 is perpendicular to the latter tangent plane $P_{a-3}$. The front vane engaging side of the adjacent trap pin 138 is located in a plane $P_{a-4}$ perpendicular to the latter support bar axis and parallel to the tangent plane $P_{a-3}$.

The wheel 192 of the vane gage 154 has a radius equal to the throat width dimension $R_b$ at the center chord station B of the master 110. Gage 154 is mounted in a manner such that its gage wheel 192 contacts the convex airfoil surface 36 of the master 110 at its center chord station tangent point b when the master occupies its gaging position in the fixture. The longitudinal axis of the plunger 188 of the gage transducer 184 is perpendicular to a plane $P_{b-3}$ tangent to the gage wheel 192 at its point of contact with the airfoil surface 36. The longitudinal axis of the plunger 202 of the gage transducer 156 is perpendicular to the latter tangent plane. The end vane engaging face of the plunger tip 206 is located in a plane $P_{b-4}$ perpendicular to the plunger axis and parallel to the tangent plane $P_{b-3}$.

As noted earlier, the gage pins 234, 236 of the vane gage 158 have a common axis R which is normal to the trap planes $P_T$ and parallel to the stacking axis 20 of the master 110 when the latter occupies its gaging position in the fixture 102. The gage pins are mounted on the fixture to contact the buttress shoulder faces 26, 28 of the master at the points on these faces between which is measured the airfoil length dimension U in FIG. 4.

Figure 13:
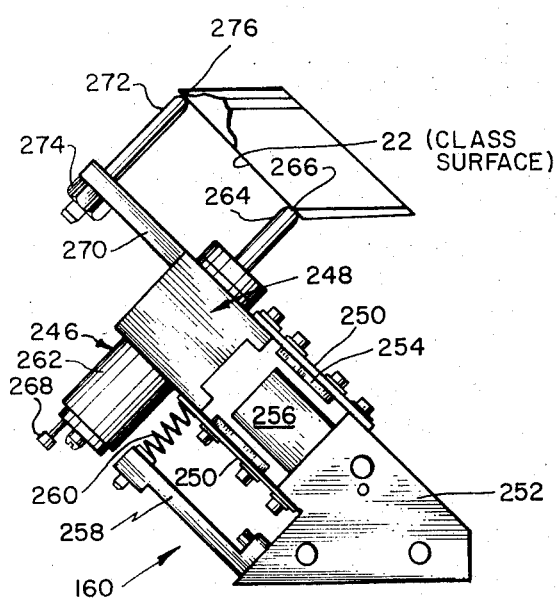
FIG. 13 is a detail of one gage of the fixture.
Figure 14:
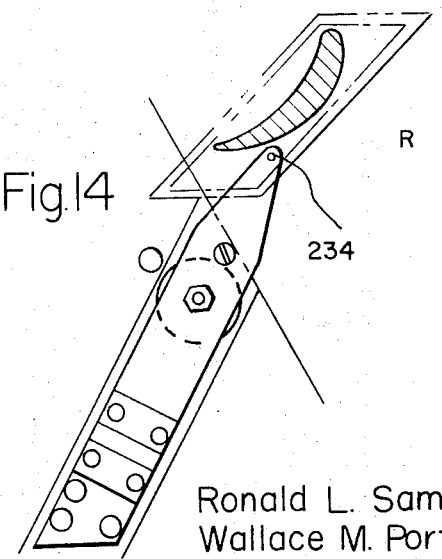
FIG. 14 is a detail of another gage of the fixture.
Figure 8:
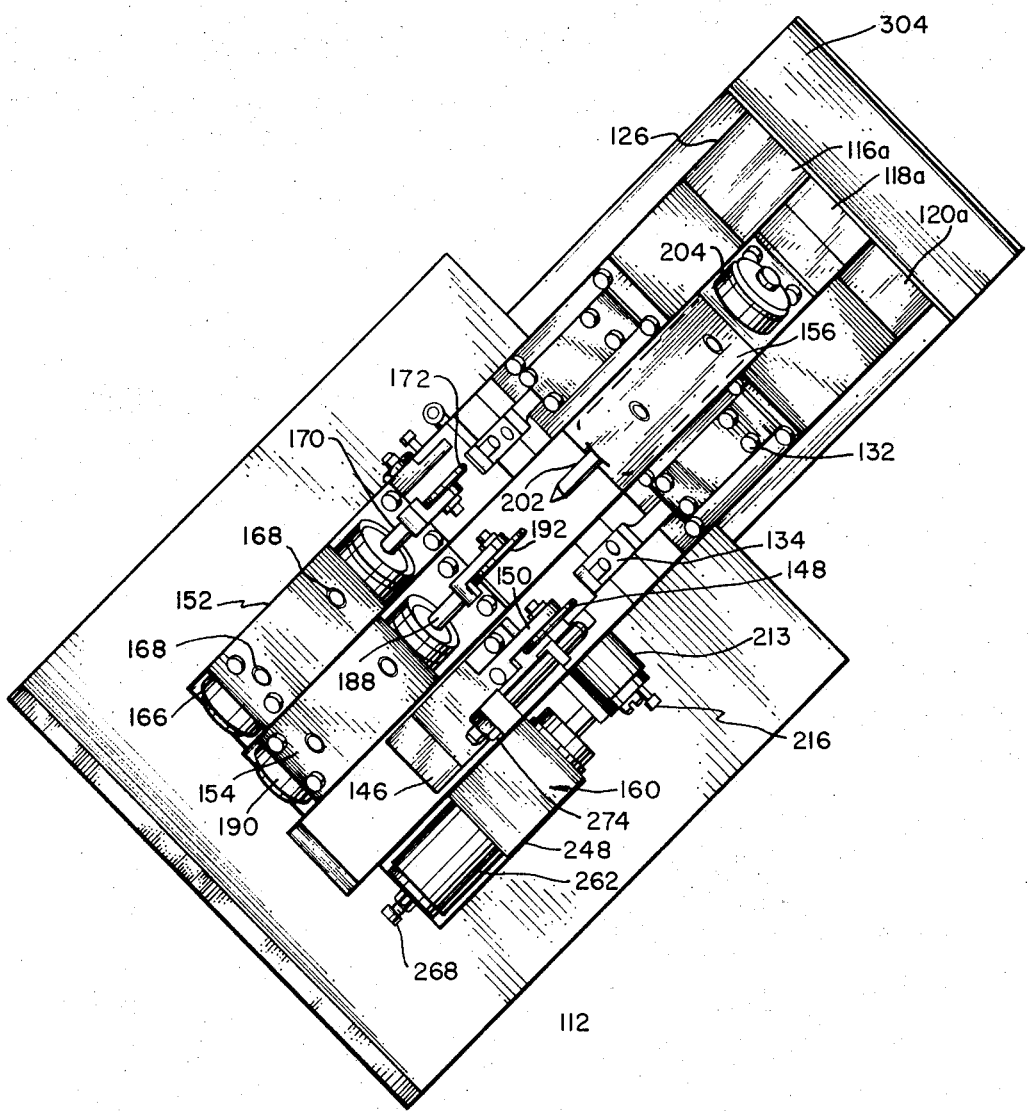
FIG. 8 is a front view of the gaging fixture looking in the direction of the arrow 8 in FIG. 7.
Figure 15:
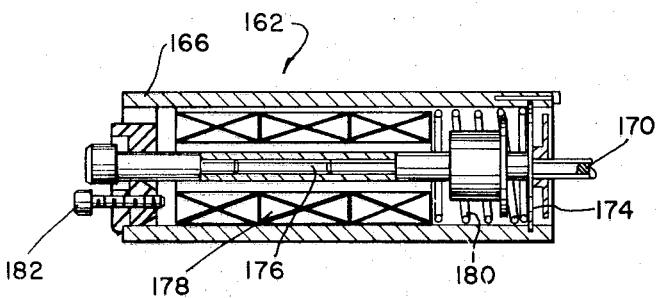
FIG. 15 is a longitudinal section through a gage transducer.

Referring to FIG. 13, it will be seen that the remaining gage 160 is mounted on the gaging fixture 102 so that its transducer plunger 264 and gage pin 272 are normal to the adjacent class face 22 of the tip buttress 14 of the master 110 when the latter is in gaging position. The plunger and pin are laterally spaced a predetermined distance approximating the length of the face so that the plunger and pin contact the face adjacent its ends. In this regard, it will be observed that the gage pin is retained in seating contact with the class face solely by the gage spring 260. The gage plunger, on the other hand, is retained in seating contact with the class face by the conjoint action of the gage spring 260 and the flexures in the gage transducer 246. Accordingly, the plunger is movable axially relative to the pin to permit contact of both the plunger and pin with the class face.

From the description to this point, it is evident that when a vane (either a production vane 10 or the master 110) is placed in gaging position in the gaging fixture 102, the perpendicular spacing between the planes $P_{a-3}$, $P_{a-4}$ in FIG. 9 equals the effective airfoil thickness R (FIG. 5a) of the vane at its airfoil root chord station A. Accordingly, since the vane traps 140 are fixed during the gaging operation, the axial position of the transducer plunger 170 of vane gage 152 is related to the effective airfoil thickness R. Similarly, the perpendicular spacing between the planes $P_{b-3}$, $P_{b-4}$ in FIG. 10 equals the effective airfoil thickness S (FIG. 5b) at the center chord station B of the vane. The relative axial positions of the transducer plungers 188, 202 of vane gages 154, 156 are thus related to the airfoil thickness S. Finally, the perpendicular spacing between the planes $P_{c-3}$, $P_{c-4}$, in FIG. 10 equals the effective airfoil thickness T (FIG. 5c) at the tip chord station C of the vane. The gage pins 234, 236 of the vane gage 158 seat against the inner confronting faces 26, 28 of the root and tip buttresses 14, 16 of the vane. The axial position of the plunger 212 of the gage transducer 210 is thus related to the airfoil length dimension U in FIG. 4. The transducer plunger 264 and gage pin 272 of the remaining gage 160 seat against the tip buttress class face 22 of the vane. The relative axial positions of the plunger and pin is thus related to the angle of the class face.

The operation of the gaging fixture 102 will now be described. As noted earlier, the present gaging instrument has two gaging modes, to wit, a prediction gaging mode and a classification gaging mode. In the prediction gaging mode, the master 110 is initially placed in gaging position in the fixture, and the transducers of the vane gages 152, 154, 158, 158, and 160 are nulled by axially adjusting their coils relative to their plungers. In this regard, it will be recalled that each transducer has a coil-adjusting screw. It should also be noted here that the transducers are energized from a power supply in the computer 104, to be described presently, and that this computer is equipped with means for reading the output voltage of each transducer to permit nulling of the transducers. Suffice it to say at this point that when the transducers have been properly nulled, each transducer produces a null or zero output voltage.

The master 110 is now removed from the gaging fixture 102 and a production vane 10 to be gaged is placed in gaging position in the fixture. The transducer plungers of the several vane gages 152, 154, 156, and 158 now assume axial positions determined by the airfoil dimensions of the production vane, the gage transducers produce output voltages proportional to the differences in the corresponding airfoil dimensions of the production vane and master. More specifically, the transducer 162 of the root vane gage 152 produces an output voltage proportional to the difference $\Delta R$ in the effective airfoil thickness dimension R at the root chord station A of the vane and master. The transducers 184, 198 of the center vane gages 154, 156 produce output voltages whose sum or difference, depending upon whether the transducer coils are wound in the same direction or in opposite directions, is proportional to the difference $\Delta S$ in the effective airfoil thickness dimension S at the center chord station B of the vane and master. In the particular embodiment of the invention illustrated, the center gage transducer coils are wound in such a way that the difference between the transducer output voltages is proportional to the difference $\Delta S$ in the airfoil thickness dimension S of the production vane and master. Since the vane traps 140 and vane stop 144 are fixed relative to one another and to the fixture base plate 112, the remaining airfoil thickness dimension - at the tip chord station C, as it is gaged in the present gaging fixture 102, has the same effective value for both the master and the production vane. Finally, the transducer 210 of the vane gage 158 produces an output voltage proportional to the difference $\Delta U$ in the effective airfoil length dimension U of the wave and master. The output voltage of the remaining class face transducer 160 is not involved in the prediction classification mode of the instrument. It will be immediately recognized by those versed in the art that the above $\Delta R$, $\Delta S$, and $\Delta U$ dimensions to which the gage output voltages are proportional are the same $\Delta R$, $\Delta S$, and $\Delta U$ dimensions which are included as terms of the prediction formula mentioned earlier. As will be explained presently, the computer 104 of the gaging instrument combines the $\Delta R$, $\Delta S$, and $\Delta U$ output voltages of the gages 152, 154, 156, and 158 in the prediction gaging mode according to the class formula for the particular vanes being gaged and produces a figure of merit readout representing the difference in the class values of the production vanes and master. This figure of merit readout is then converted, with the aid of existing conversion tables, to an angle at which the class face 22 of the production vane must be machined to provide the finished machined vane with a selected class value. The class face of the vane is then machined to that angle by existing vane machined techniques.

In the classification gaging mode of the gaging instrument, the master 110 is replaced in gaging position in the gaging fixture 102 and the null condition of each vane gage 152, 154, 156, 158, and 160 is again checked and re-established, if necessary. The machined production vane 10 is then replaced in the fixture. It is evident that the vane gages 152, 154, 156, and 158 now produce the same output voltages which they did in the prediction gaging mode, i.e., voltages proportional to the ΔR, ΔS, and ΔU dimensions of the production vane. The class face gage 160 produces an output voltage proportional to the difference in the class face angles of the production vane and master. In this latter regard, consider FIG. 13 wherein it will be observed that the gage plunger 264 assumes one axial position relative to the gage pin 272 when the master 110 is in gaging position in the fixture 102. The gage transducer 246 is nulled in this position of the plunger. When the production vane 10 is placed in gaging position in the fixture, the gage plunger 264 assumes an axial position relative to the gage pin 272 determined by the angle of the machined class face 22 of the vane relative to the plane occupied by class face 22 of the master when in gaging position. If the vane class race is precisely parallel to the latter plane, the gage plunger 264 will occupy its null position relative to the gage pin 272 and the gage 160 will continue to produce a null output during gaging of the production vane in the classification gaging mode. On the other hand, if the class face of the vane is disposed at some oblique angle relative to the latter plane; the gage plunger 264 will be displaced axially from its null position with respect to the gage pin 272 by a distance ΔV.

$$\Delta V = L \tan \phi$$

where L is the perpendicular spacing between the plunger and pin and $\phi$ is the oblique angle of the vane class face relative to the plane occupied by the master class face.

From the foregoing discussion, it is evident that the displacement ΔV of the gage plunger 264 from its null position, and hence the output voltage of the gage 160, when gaging a production vane 10 in the classification gaging mode are substantially proportional to the difference in the class face angles of the vane and master. This ΔV displacement is the class face angle factor ΔV which is included as a term of the classification formula mentioned earlier. As will be explained presently, the computer 104 combines the ΔR, ΔS, ΔU, and ΔV output voltages of the vane gages 152, 154, 156, 158, and 160 in the classification gaging mode according to the class formula for the particular vanes being gaged and produces a readout representing the true class value of the machined or finished production vane.

Turning now to FIG. 16, the computer 104 of the gaging instrument includes an amplifier-demodulator 300 connected to the output of the transducer of each fixture gage 152, 154, 156, 158, and 160. The several transducers and amplifier-demodulators are connected through leads of an electrical cable 302 extending between the computer and a terminal box 304 on the rear of the gaging fixture 102. The outputs of the amplifier-demodulators 300 are connected through leads 306 to different fixed contacts of a first deck 308a of a rotary mode selector switch 310 and through leads 312 to corresponding ends of separate voltage dividers 314. Each voltage divider has a tap 316 connected to the input of a buffer amplifier 318. The outputs of the buffer amplifiers for gages 152, 154, 156, and 158 are connected through summing resistors 320 and a common lead 322 to the input of a summing amplifier 324. The output of the buffer amplifier for the remaining gage 160 is connected to the summing amplifier through the common lead and the rotary contact and one fixed contact of a second deck 308b of the mode selector switch 310. The output of the summing amplifier is connected to its input through a feed back resistor 326 and to two adjacent fixed contacts of the first mode selector switch deck 308a. A readout device 328, such as a digital voltmeter, is connected to the rotary contact of the first switch deck.

Mode selector switch 310 has a third deck 308c. The rotary contact of this third deck is connected to the input of the summing amplifier 324. Two fixed contacts of the switch deck are connected to d-c voltage sources 332, 334 through variable resistors 336, 338. Voltage sources 332, 334 produces d-c voltages of equal magnitude but opposite polarity.

Electrical power for the computer 104 of the present gaging instrument is furnished by a suitable power source which has been omitted from the drawings for the sake of clarity. This power supply also powers an oscillator 342 which is connected to the center primary windings of the transducers of the several vane gages 152, 154, 156, 158, and 160 and furnishes the excitation voltages for the transducers.

Turning to FIG. 6 it will be seen that the computer 104 has a housing 344 with a front control panel 346. Mode selector switch 310 has a knob 348 on the panel by which the switch may be rotated to its various positions. Readout device or digital voltmeter 328 has a visual display 354 on the panel.

Referring particularly to the mode selector switch 310, the latter will be seen to have a predict position, a classify position, and five additional positions which are hereafter referred to as calibration positions. In the predict position, the first switch deck 308a connects the output of the summing amplifier 324 to the digital voltmeter 328, the second switch deck presents an open circuit between the vane gage 160 and the summing amplifier, and the third switch deck 308c connects the variable resistor 338, hereafter referred to as a trimming adjustment resistor, to the input of the summing amplifier. In the classify position of the mode selector switch, the first switch deck again connects the output of the summing amplifier to the digital voltmeter, the second switch deck closes the circuit between the vane gage 160, and the summing amplifier, and the third switch deck connects the variable resistor 336, hereafter referred to as the classify constant adjustment resistor, to the input of the summing amplifier. In the remaining five calibration positions of the selector switch, the first switch deck connects the outputs of the individual amplifier-demodulators 300 to the digital voltmeter, one at a time. The second and third switch decks present open circuits in each of these five calibration positions.

From the foregoing description of the computer 104, it will be understood that in the predict position of the mode selector switch 310, the transducers of the vane gages 152, 154, 156, and 158 are connected to the input of the summing amplifier 324 through their respective amplifier-demodulators 300, voltage dividers 314, buffer amplifiers 318, and the common lead 322. The voltage sources 332, 334 are connected to the input of the summing amplifier through the trimming adjustment resistor 338. In the classify position of the mode selector switch, the transducers of all the vane gages 152, 154, 156, 158, and 160 are connected through the respective amplifier-demodulators 300, voltage dividers 314, buffer amplifiers 318, and the common lead 322 to the input of the summing amplifier. The negative voltage source 332 is connected to the input of the summing amplifier through the classification constant adjustment resistor 336. Rotation of the selector switch to any one of its remaining five calibration positions connects the output of the amplifier-demodulator 300 for one of the vane gages 152, 154, 156, 158, or 160, depending upon the calibration position, directly to the digital voltmeter 328.

The overall operation of the present gaging instrument will now be explained. This operation involves three basic steps, to wit, a first calibration step, a second prediction gaging step, and a third classification gaging step. In the first calibration step, the master 110 is placed in gaging position in the gaging fixture 102, and the mode selector switch 310 of the computer 104 is turned to one of its five calibration positions to connect the transducer of one of the vane gages, say gage 152, directly to the digital voltmeter 328. The gage transducer 162 is then nulled by rotating its coil-adjusting or calibration screw 182 to move the transducer coil to its null position relative to the transducer plunger 170 as indicated by a zero or null reading on the voltmeter readout display 354. Thereafter, the transducers of the remaining vane gages 154, 156, 158, and 160 are similarly nulled in succession by turning the mode selector switch to the calibration position for each gage and rotating the respective transducer calibration screw to obtain a null reading on the voltmeter.

The instrument is now conditioned for its second prediction gaging step by rotating the mode selector switch 310 to its "predict" position and the resistor 338 is then adjusted to obtain a zero reading on the digital voltmeter display 354. At this point, the master 110 is replaced by an unmachined production vane 10. As explained earlier, the transducers of the vane gages 152, 154, 156, and 158 now produce a-c output voltages representing the differences $\Delta R$, $\Delta S$, and $\Delta U$ in their respective gaged airfoil dimensions of the vane and master, i.e., the output voltage of gage 152 represents the $\Delta R$ dimension, the difference in the output voltages of the gages 154, 156 represents the $\Delta S$ dimension, and the output voltage of the gage 158 represents the $\Delta U$ dimension.

These gage output voltages are amplified and demodulated in the amplifier-demodulators 300 to produce d-c voltages representing the dimensional deviations $\Delta R$, $\Delta S$, and $\Delta U$ of the production vane. The d-c voltages from the amplifier-demodulators are applied to the corresponding voltage dividers 314. Each voltage divider is set to produce an output voltage equal to the product of its respective input voltage and a constant determined by the class formula of the vanes being gaged, as explained presently. The output voltages from the voltage dividers are amplified in the buffer amplifiers 300 and applied to the input of the summing amplifier 324 along with the output voltage from the trimming resistor 338. Summing amplifier 324 adds and produces an output voltage proportional to the algebraic sum of the several amplifier input voltages which output voltage is applied to the digital voltmeter 328. The resulting reading of the voltmeter is a figure of merit representing the difference on the class values of the production vane and master. This figure of merit is converted, with the aid of existing charts or tables, to an angle at which the class face 22 of the production vane must be machined to produce the finished machined vane with a selected class value which may be either that of the master 110 or some other class value.

After being gaged in the manner just explained, the production vane 10 is removed from the gaging fixture 102 and the class face 22 of the vane machined to the angle obtained in the prediction gaging step. The techniques used to machine the face are well-known and do not constitute a part of the present invention. Accordingly, it is unnecessary to discuss these machining techniques in the present disclosure.

In the final classification gaging step of the gaging instrument, the master 110 is replaced in gaging position in the gaging fixture 102 and the mode selector switch 310 is stepped through its calibration positions to make certain that the transducers of the vane gages 152, 154, 156, 158, and 160 are still in their null conditions. Any transducer which provides other than a null reading on the voltmeter 328 is re-nulled in the manner explained earlier. The mode selector switch is then rotated to its "classify" position and the classify constant adjustment resistor 336 is adjusted to obtain on the voltmeter readout display 354 a reading equal to the class value of the master.

At this point, the master 110 is replaced by the machined production vane 10. The transducers of the vane gages 152, 154, 156, and 158 then again produce output voltages representing the differences $\Delta R$, $\Delta S$, and $\Delta U$ in their respective airfoil dimensions of the production vane and master as they did in the prediction gaging step. In the present classification gaging step, the transducer of the vane gage 160 produces an output voltage representing the difference $\Delta V$ in the class face angle factor of the production vane and master. The output voltages from the several trasducers are amplified and demodulated in the amplifier-demodulators 300 to produce d-c voltages representing the $\Delta R$, $\Delta S$, $\Delta U$, and $\Delta V$ dimensions of the production vane. These d-c voltages are applied to the corresponding voltage dividers 314, and the output voltages from these dividers are amplified in the buffer amplifiers 318 and applied to the summing amplifier 324 along with the output voltage from the classify constant adjusting resistor 336. The output from the summing amplifier, which is the algebraic sum of the input voltages as before, is applied to the digital voltmeter. In this case, the voltmeter reading represents the true class value of the machined production vane.

At this point, it is significant to recall that the present gaging instrument is designed to carry out a turbine vane prediction and classification gaging procedure which involves the use of class formulas that express a fixture of merit of production vane in terms of its $\Delta R$, $\Delta S$, and $\Delta U$ dimensions and the true class value of the production vane in terms of its $\Delta R$, $\Delta S$, $\Delta U$, and $\Delta V$ dimensions. Before explaining these formulas further, it is helpful to recall the earlier discussion relating to turbine classes. As noted in that discussion, a set of turbine vanes of any given design are adapted for assembly into an annular configuration with the surfaces of adjacent vanes in seating contact to form an annular nozzle ring of given diameter, i.e., inside and outside diameter. Each pair of adjacent vanes defines an intervening throat. The total nozzle ring flow area equals the sum of the several vane throat areas. Viewed in another way, the nozzle ring as a whole presents a given annular area determined by the inner and outer diameters of the ring. This annular area is divided into incremental sectors equal in number to the vanes and each occupied by a vane and its respective throat. The area of each sector equals the annular area of the nozzle ring divided by the number of vanes. In the following discussion, the equal areas of these sectors are referred to as sector areas. The flow area of a vane obviously equals this sector area minus the blocked area of the vane.

As noted in the earlier discussion, turbine vanes may be installed in a nozzle ring in any one of a range of angular positions, by machining the class surfaces of the vanes to the appropriate angles, in order to vary the vane throat areas and hence the total nozzle ring flow area. In this regard, it is apparent that changing the angle of a vane changes its blocked area and thereby its flow area which equals the difference between sector area and blocked area. The different throat areas which are provided by these different angular positions are referred to as classes. Each vane is characterized and designated by its respective class value.

A full range of classes for a particular vane design may include any number of classes which are denoted by the numbers, 1, 2, 3, ... N. Typically, the number of classes for a given turbine vane design is in the range from 15 to 30. In some cases, the classes are divided into half classes. The delta angle and delta throat angle between successive classes is substantially constant over the entire class range.

It is evident from the foregoing discussion that the numerical class value of a turbine vane is proportional to its flow area and the flow area, in turn, is proportional to the class value. From this it will be understood that the difference in flow area of the master 110 and production vane 10 is proportional to the difference in their numerical class values.

Returning now to the matter of the class formulas, i.e., "figure of merit" formula, and "true class value" formula, which are used in the present gaging instrument, these formulas are derived from known basic class formulas which express the flow areas $A_F$ of turbine vanes in terms of their R, S, U, and V dimensions. While these basic class formulas vary from one vane design to another, they are of the general form:

1. $A_F = K_1 - K_2R - K_3S + (K_4U - K_5) + V$ where $K_1$, $K_2$, $K_3$, $K_4$, and $K_5$ are constants determined by each vane design and the R, S, and U dimensions are measured at the class angle of the vane.

The first constant term $K_1$ of the above basic class formula actually represents the sector area allotted to the vane and the remaining terms represent the blocked area of the vane. As noted earlier, the difference between the sector area of a vane and its blocked area equals the flow area of the vane.

It is apparent from the basic class formula that if the master 110 and a production vane 10 are assumed to have equal class surface angle factors V, i.e., the $\Delta V$ dimension of the production vane is zero, the difference $\Delta A_F$ in their flow areas at the basic class angle of the master is expressed by the following equation:

2. $\Delta A_F = -K_2\Delta R = K_3\Delta S + K_4\Delta U$

As noted earlier, the difference in flow areas of the master 110 and production vane 10 is proportional to the difference in their numerical class values. Assuming that the proportionality factor between flow area and numerical class value is represented by the constant $K_F$, it is apparent that equation (2) may be rewritten to express the difference $\Delta N$ in the class values of the master and production vane as follows:

3. $\Delta N = (-K_2\Delta R - K_3\Delta S + K_4\Delta U) K_F$

The above equation is the "figure of merit" class formula which is used in the prediction gaging mode of the present gaging instrument. The quantity $\Delta N$ is the figure of merit readout which the instrument provides in this gaging mode and which is converted, with the aid of existing tables, to an angle to which the class surface 22 of the production vane must be machined to obtain a finished vane of selected class value.

Referring now once again to the basic class formula (1) above, it is apparent that if the class surface angle factors V of the master 110 and production vane 10 are taken into account, the difference in their flow areas is expressed by the equation:

4. $\Delta A_F = -K_2\Delta R - K_3\Delta S + K_4\Delta U + \Delta V$

Since this difference in flow areas is proportional to the difference in the numerical class values of the master and production vane, the true class value of the production vane may be expressed by the class formula:

5. $N = K_C -(-K_2\Delta R\Delta - K_3\Delta S + K_R\Delta U + \Delta V) K_F$ where $K_C$ is the numerical class value of the master and $K_F$ is the proportionality factor between flow area and class value as before.

This latter class formula is the "true class value" formula which is used in the classification gaging mode of the present gaging instrument.

For convenience in the following discussion, the "figure of merit" and "true class value" formulas (3) and (5) are rewritten as 6. $\Delta N = -K_R\Delta R - K_S\Delta S + K_U\Delta U$ 7. $N = K_C - (-K_R\Delta R - K_S\Delta S + K_U\Delta U + K_V\Delta V)$ and will be hereinafter referred to as a prediction formula and a classification formula, respectively.

Referring again to the present gaging instrument, the transducers of the vane gages 152, 156, 156, 158, and 160 are matched to produce the same output voltage in a given plunger displacement from null position. The voltage divider 314 for gage 152 is set to have a ratio equal to the class formula constant $K_R$. The voltage dividers for gages 154, 156 are set to have ratios equal to the constant $K_S$. Similarly, the voltage dividers for the remaining gages 158 and 160 are set to have ratios equal to the constants $K_U$ and $K_V$, respectively. The classify constant adjustment resistor 336 and the voltage source 332 provides the master vane class constant $K_C$.

In the operation of the instrument, the vane gage transducers are initially nulled, in the manner explained earlier, with the master 110 in gaging position in the gaging fixture 102. The mode selector switch 310 is then turned to its predict position and the trimming resistor 338 is adjusted to obtain a zero reading on the display 354 of the digital voltmeter 328. This trimming resistor is provided to null out any stray voltages resulitng from unbalance of the computer amplifiers. The instrument is now calibrated for the prediction mode by effectively introducing known $\Delta R$, $\Delta S$, and $\Delta U$ dimensions into the instrument, one at a time, and adjusting the computer to provide the correct figure of merit ($\Delta N$) readout as obtained by computation using the appropriate prediction formula (6). This calibration may be accomplished, for example, by inserting a shim of known thickness between the master 110 and the transducer plunger of each of the vane gages 152, 154, 156, and 158 in succession and adjusting the gain of the corresponding amplifier-demodulator 300 until the correct figure of merit readout is displayed. After this prediction calibration of the instrument has been accomplished, the latter is calibrated for its classification mode by turning the mode selector switch 310 to its classify position and then adjusting the classify constant adjustment resistor 336 to obtain on the digital voltmeter display 354 a readout equal to the numerical class value (basic class value) of the master 110. This adjustment of the resistor 336 serves the two-fold purpose of nulling out any stray voltages in the system, as did the trimming resistor 338 in the prediction calibration step, and introducing into the system the class value constant $K_C$ in the classification formula (7) above. In this regard, it will be apparent from the latter formula that with the master 110 in gaging position, the $\Delta R$, $\Delta S$, $\Delta U$, and $\Delta V$ dimensions are zero and the numerical class value obtained with the formula in the basic class value of the master. The instrument is now conditioned for its actual gaging operation explained earlier.

As noted in the earlier description of this gaging operation, the instrument is set for its prediction gaging mode by turning the mode selector switch 310 to its predict position. The production vane 10 is then placed in the gaging fixture 102. In this mode, the $\Delta R$, $\Delta S$, and $\Delta U$ dimensions of the vane are gaged, by the vane gages 152, 154, 156, and 158 which produce output voltages proportional to the respective delta dimensions. From the description of the computer 104, it is apparent that these output voltages are combined according to the particular prediction formula (6) for which the computer is set and the computer voltmeter 328 displays the correct figure of merit $\Delta N$ for the production vane. In this regard, it is significant to recall that the prediction formula is derived with the assumption that the $\Delta V$ dimension of the production vane is zero. This assumption is effectively introduced into the instrument by the third deck 308b of the mode selector switch 310 which is open in the predict mode to provide the summing amplifier 324 with an effective zero $\Delta V$ voltage from the class surface gage 160.

The instrument is now set for its classification mode by turning the mode selector switch 310 to its classify position. The master 110 is then replaced in the gaging fixture 102 and the null condition of the gage transducers is rechecked, as explained earlier. Thereafter the production vane 10, which is now machined to the predicted class surface angle, is again plated in the gaging fixture. In the classify mode, the $\Delta R$, $\Delta S$, $\Delta U$, and $\Delta V$ dimensions of the vane are gaged by the vane gages 152, 154, 156, 158, and 160 which produce output voltages proportional to the respective dimensions. From the description of the computer, it is apparent that these output voltages and that from the classify constant resistor 336 are now combined according to particular classification formula (7) for which the computer is set and the voltmeter 328 displays the true class, i.e., true numerical class value, of the machined production vane.

It will now be understood that use of the present instrument to gage vanes of different design requires use of different class formulas, i.e., prediction and classification formulas, in the computer 104. To this end, the voltage dividers and resistors of the computer may be mounted on a plug-in card (circuit board) which may be inserted into and removed from the computer at will and the instrument may be provided with a number of such plug-in cards, having the proper circuit values for different selected class formulas. Switching from one set of class formulas to another may then be accomplished by merely inserting the proper card into the computer.

At this point, it should be noted that where the disclosed embodiment of the invention operates in both the prediction gaging mode and the classification gaging mode, the instrument may be designed for use in either mode alone. Also, it is significant to note that the invention is concerned only with determining, in the prediction gaging mode, the proper machining angle of the production vane class face and, in the classification gaging mode, the true class value of the vane on the basis of its airfoil dimensions and class face angle. The machining angles of the remaining seating surfaces 22 of the vane are fixed by the vane design.

What is claimed as new in support of Letters Patent is:

1. An instrument for gaging a production turbine vane having an airfoil with convex and concave surfaces and a sharp trailing edge, root and tip buttresses at the ends of said airfoil with inner confronting shoulder surfaces presented longitudinally of said airfoil, and a class surface along one edge of the tip buttress facing in the same direction as said convex airfoil surface, said airfoil having root and tip chord stations adjacent said root and tip buttresses, respectively, and a center chord station adjacent the center of the airfoil, said instrument comprising:

a frame;

means on said frame for locating said vane in a fixed gaging position relative to said frame wherein said airfoil chord stations are located in fixed spaced parallel planes of said frame;

said locating means comprising means for pivotally seating said airfoil trailing edge to pivotally support said vane on a fixed pivot axis of said frame transverse to said planes, a first fixed vane stop at one side of said axis including a vane engaging element fixed against movement relative to said frame and located in the tip chord station plane of the frame a distance from said axis for engaging said convex airfoil surface in said latter plane at a position spaced from the airfoil trailing edge to locate said vane at a fixed angle relative to said frame, and a second fixed vane stop including a vane engaging element fixed against movement relative to said frame and located on a second axis normal to said planes for engaging one buttress shoulder surface of said vane to locate said vane in a fixed position relative to said frame longitudinally of the vane airfoil;

first and second vane gages on said frame at said one side of said pivot axis in the center and root chord station planes, respectively, of said frame, each gage including means movable along an axis in the respective gage plane and offset from said pivot axis for engaging said convex airfoil surface in the respective gage plane at a position spaced from the airfoil trailing edge and an electrical transducer for producing an output voltage representing the position of said gage vane engaging means along its axis of movement;

a third vane gage on said frame at the opposite side of said pivot axis and directly opposite said first gage including means movable along an axis in said center chord station plane parallel to the axis of movement of the vane engaging means of said first gage and intersecting said pivot axis for engaging the concave airfoil surface along said airfoil trailing edge, and an electrical transducer for producing an output voltage representing the position of said third gage vane engaging means along its axis of movement;

a fourth vane gage on said frame including means movable along said second axis for engaging the other vane buttress shoulder surface, and an electrical transducer for producing an output voltage representing the position of the latter vane engaging means along its axis of movement;

a fifth vane gage on said frame including means engagable with said class surface for producing an output voltage representing the angle of said class surface relative to a given plane of said frame normal to said chord station planes; and a computer coupled to the outputs of said gages including mode selection means for conditioning said computer for operation in either a prediction gaging mode or a classification gaging mode, means operable in said prediction mode for combining the output voltages of said first, second, third, and fourth gages according to a selected prediction formula and producing an output representing the combined voltages while said vane remains fixed in said gaging position, and means operable in said classification mode for combining the output voltages of all of the gages according to a selected classification formula and producing an output representing the combined voltages while said vane remains fixed in said gaging position.

2. A gaging instrument according to claim 1 wherein:

said airfoil edge seating means and said first fixed stop element are horizontally offset in a manner such that said vane is retained by gravity in said gaging position with said airfoil edge seating in said seating means and the vane airfoil resting against said first stop element.

3. A gaging instrument according to claim 1 wherein:

said computer comprises an output circuit for each vane gage including means for multiplying the output voltage of the respective gage by a given constant, means for summing the outputs of the circuits, and means for connecting said summing means to the output circuits of said first, second, third, and fourth gages in said prediction mode and to the output circuits of all the gages in said classification mode.

4. A gaging instrument according to claim 1 wherein:

each gage includes means for nulling the gage output when a precisely dimensioned master vane is located in said gaging position.

5. A gaging instrument according to claim 4 wherein:

said given plane of said frame corresponds to said class surface on said master vane when said master vane is located in said gaging position; and said fifth vane gage comprises a support mounted on said frame for movement along a direction line normal to said given plane, a vane engaging element fixed to said support for engaging the class surface of the vane in gaging position, an electrical transducer on said support including a plunger movable relative to said support along an axis parallel to said direction line and offset from the latter element for engaging the class surface of the vane in gaging position, and said latter element and plunger comprising said vane engaging means of said fifth vane gage.

6. A gaging instrument according to claim 5 wherein:

said airfoil edge seating means and said first fixed stop element are horizontally offset in a manner such that said vane is retained by gravity in said gaging position with said airfoil edge seating in said seating means and the vane airfoil resting against said first stop element.

7. A gaging instrument according to claim 6 wherein:

said computer comprises an output circuit for each vane gage including means for multiplying the output voltage of the respective gage by a given constant, means for summing the outputs of the circuits, and means for connecting said summing means to the output circuits of said first, second, third, and fourth gages in said prediction mode and to the output circuits of all the gages in said classification mode.

* * * * *